UNITED STATES PATENT OFFICE.

ANDREA ANGEL, DECEASED, LATE OF OXFORD, ENGLAND, BY MARY LETITIA ANGEL, EXECUTRIX, OF OXFORD, ENGLAND.

DYESTUFFS AND PROCESS OF MAKING SAME.

1,340,696. Specification of Letters Patent. Patented May 18, 1920.

No Drawing. Application filed July 16, 1918. Serial No. 245,166.

*To all whom it may concern:*

Be it known that ANDREA ANGEL, late a resident of the city and county of Oxford, England, did invent the new and useful Dyestuffs and Process of Making the Same, of which the following is a specification.

This invention consists in the manufacture and production of new compounds to be employed as coloring matters, or in the manufacture and production of coloring matters; the said new compounds being characterized by a hitherto unknown heterocyclic grouping of atoms.

The compounds produced according to this invention contain a hitherto unknown formation in which two benzene nuclei, (which may be substituted, or not) are linked together by two nitrogen atoms through the four para-carbon atoms of such nuclei. Such compounds may be referred to as parazenes.

Certain parazene derivatives may be regarded as having three possible benzenoid-quinonoid isomers, namely, in certain cases of unsymmetrical substitution in the benzene ring, thus:—

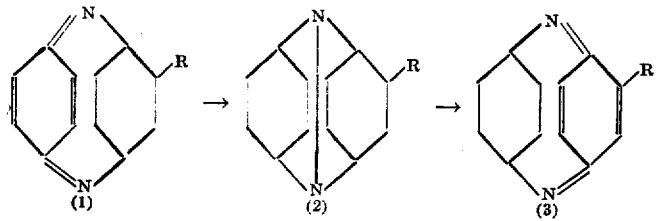

(in which R is a radical or an element other than hydrogen). When R is replaced by hydrogen (producing simple parazene) the substance corresponding to phase (3), is identical with that corresponding to phase (1) thus:—

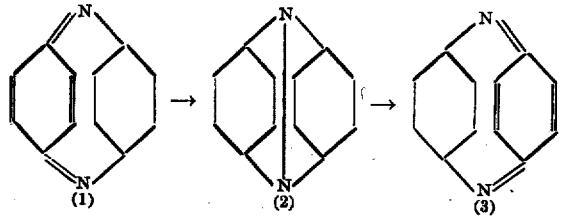

The parazenes may be prepared by taking a para-halogen amido benzene, or a derivative thereof, (or 1.4 amido halogen naphthalene, or 1.4 amido halogen anthracene, or derivatives thereof,) and heating it with a condensing agent; such as zinc chlorid, ferric chlorid, aluminium chlorid, or phosphorus pentoxid, or the like, whereby a dihydro-parazene is formed which, on oxidation, constitutes parazene. The product when dissolved, for instance in acetic acid, can be used as a dye for wool, or for silk.

As an example of how this invention may be performed:—If it be desired to produce a simple parazene; para-chloranilin, or para-brom-anilin, is heated carefully in an open vessel with the selected condensing agent, say zinc chlorid, at a temperature of, or about, 200° centigrade, and, while stirring, say for about an hour, or an hour and a half. The mass, after cooling, can be dissolved in acetic acid and diluted with water and be used as a dye for wool, or for silk.

The parazene from para-chloranilin can be isolated, in the condition of a dark blue powder, by allowing the mass to remain in water until the zinc chlorid has become dissolved and then removing the solution by filtration.

Parazene may be caused to form salts with acids by addition to one, or both, of the nitrogen atoms.

Auxochromic groups may be introduced to enhance the properties as a dyestuff, or coloring matter, or to produce special dyes, or coloring matters.

In addition to ordinary substitution; such, for instance, as the introduction of alkyl, halogen, amino, hydroxy, or sulfonic, groups, or the like, complex parazenes may be obtained. For instance, if, instead of the original benzene nuclei, naphthalene nuclei be linked in a similar way, naphthaparazene will be obtained. Similarly a mixed benzene-naphthalene parazene can be obtained, while, from anthracene nuclei, can be obtained, anthraparazene, or benzene-anthracene parazene, and, from anthraquinone complexes, an isomerid of anthraquinoneazine, as well as mixed bodies by the linking of more than one benzene nucleus with one, or more than one, naphthalene, anthracene, or anthraquinone, nucleus.

What I claim is:—

1. A dye stuff comprising parazene as an essential constituent thereof.

2. A dye stuff comprising as an essential element thereof a compound in which two benzenoid nuclei are linked by two nitrogen atoms through four para-carbon atoms of such nuclei.

3. The process of preparing parazene, which comprises heating a para-halogen amido hydrocarbon with a condensing agent and oxidizing the reaction product.

4. The process of preparing parazene which comprises heating para-halogen amido benzene with zinc chlorid and oxidizing the reaction product.

5. The process of preparing a parazene which comprises heating para-halogen anilin with zinc chlorid in an open vessel for from one to one and a half hours at a temperature of about 200° C. while stirring.

6. A dye comprising parazene dissolved in acetic acid.

In testimony whereof I have signed my name to this specification in the presence of two subscribing witnesses.

MARY LETITIA ANGEL,
*Executrix of Andrea Angel, deceased.*

Witnesses:
G. R. BREWIS,
LEONARD HODGSON.